United States Patent [19]

Seki et al.

[11] Patent Number: 4,592,633

[45] Date of Patent: Jun. 3, 1986

[54] PHOTOGRAPHING APPARATUS

[75] Inventors: Takatoshi Seki; Norio Ookawa; Tatsuo Yoshino; Takashi Yamamoto, all of Kanagawa, Japan

[73] Assignee: Fuji Photo Film Co., Ltd., Kanagawa, Japan

[21] Appl. No.: 670,726

[22] Filed: Nov. 13, 1984

[30] Foreign Application Priority Data

Nov. 30, 1983 [JP] Japan ................. 58-226218

[51] Int. Cl.⁴ ............................................. G03B 29/00
[52] U.S. Cl. ......................................... 354/76; 355/27
[58] Field of Search .............. 354/76, 78, 75, 90, 354/89, 120–125; 355/27

[56] References Cited

U.S. PATENT DOCUMENTS 4,192,594  3/1980  Oidaira et al. .................. 354/90
4,206,465  6/1980  Tamoto et al. ................. 354/123 X

FOREIGN PATENT DOCUMENTS 2906042  8/1980  Fed. Rep. of Germany ........ 354/90
3310093 10/1983  Fed. Rep. of Germany ........ 354/75

Primary Examiner—L. T. Hix
Assistant Examiner—Brian W. Brown
Attorney, Agent, or Firm—Sughrue, Mion, Zinn, Macpeak and Seas

[57] ABSTRACT

A photographing apparatus, such as may be used with diagnostic equipment, in which exposed films can be directed either to a film receiving magazine or automatically set to a following automatic processing station. The film receiving magazine is replaceable by a dummy magazine having the same dimensions. If the dummy magazine is employed, films received therein are automatically passed through a conveying mechanism to the following processing station. A detection is made as to which of the film receiving magazine and dummy magazine is employed, and operations of the apparatus controlled accordingly.

4 Claims, 11 Drawing Figures

PHOTOGRAPHING APPARATUS

BACKGROUND OF THE INVENTION

The present invention relates to a photographing apparatus in which images displayed by an image displaying device such as a cathode-ray tube are photographed in such a manner that a single picture or a plurality of pictures are formed on the surface of a photographic film. More particularly, the invention relates to a photographing apparatus in which switching can readily be accomplished between a mode in which exposed films are received by a film accommodating magazine and a mode in which exposed films are forwarded directly to a following processing station, such as an automatic developing station.

Examples of a photographing apparatus in which images displayed by an image displaying device are photographed as described above are a separate-exposure photographing apparatus disclosed in Japanese Laid-Open Patent Application No. 60937/1980, and divisional picture photographing apparatuses proposed in U.S. Ser. Nos. 477,461 filed Mar. 21, 1983, and 596,171, filed Apr. 2, 1984.

These separate-exposure photographing apparatuses differ from one another in the film conveying direction and in the employment of magnification variation. However, they are similar to each other in that exposed films are received by a film receiving magazine.

Further, in a photographing apparatus of this type, it is desirable that the apparatus be connected through a film conveying path to an automatic developing unit, for instance, so that the exposed film can be automatically processed. In this connection, there is yet room for improvement in these conventional apparatuses.

SUMMARY OF THE INVENTION

In view of the foregoing, an object of the invention is to provide a photographing apparatus which can be readily connected to or disconnected from an automatic developing unit or the like.

The foregoing and other objects of the invention have been achieved by the provision of a photographing apparatus including an image displaying device for displaying an image to be photographed, an optical system for forming on the surface of a photographic film an image displayed by the image displaying device, and a film conveying mechanism for conveying the photographic film. This apparatus, according to the invention, is designed so that switching can readily be accomplished between a mode in which film guiding means, which receives exposed photographic films and can be set at a magazine setting position, is used to terminate the film conveying at a film receiving magazine, and a mode in which exposed films are forwarded directly to the following processing station through film guiding means used instead of the film receiving magazine.

DESCRIPTION OF THE PREFERRED EMBODIMENTS

Preferred embodiments of the invention will be described in detail with reference to the accompanying drawings.

Figure 1A:
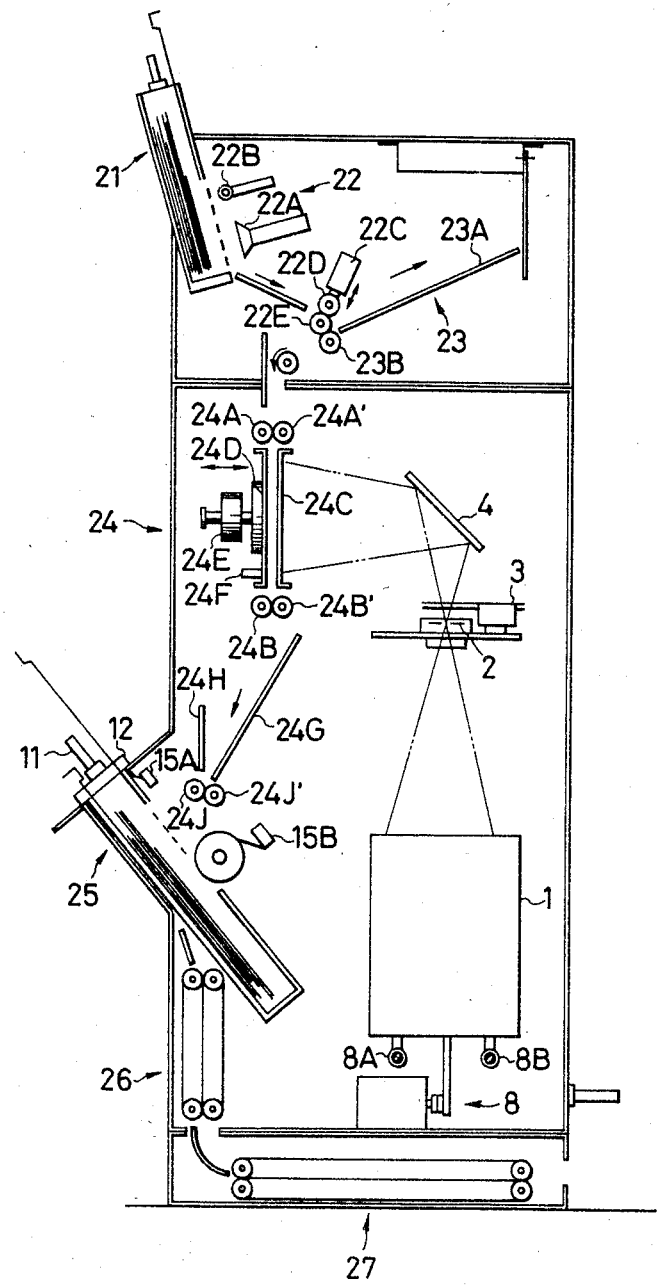
FIGS. 1A and 1B are explanatory diagrams showing the construction of a separate-exposure photographing apparatus of the invention.
Figure 1B:
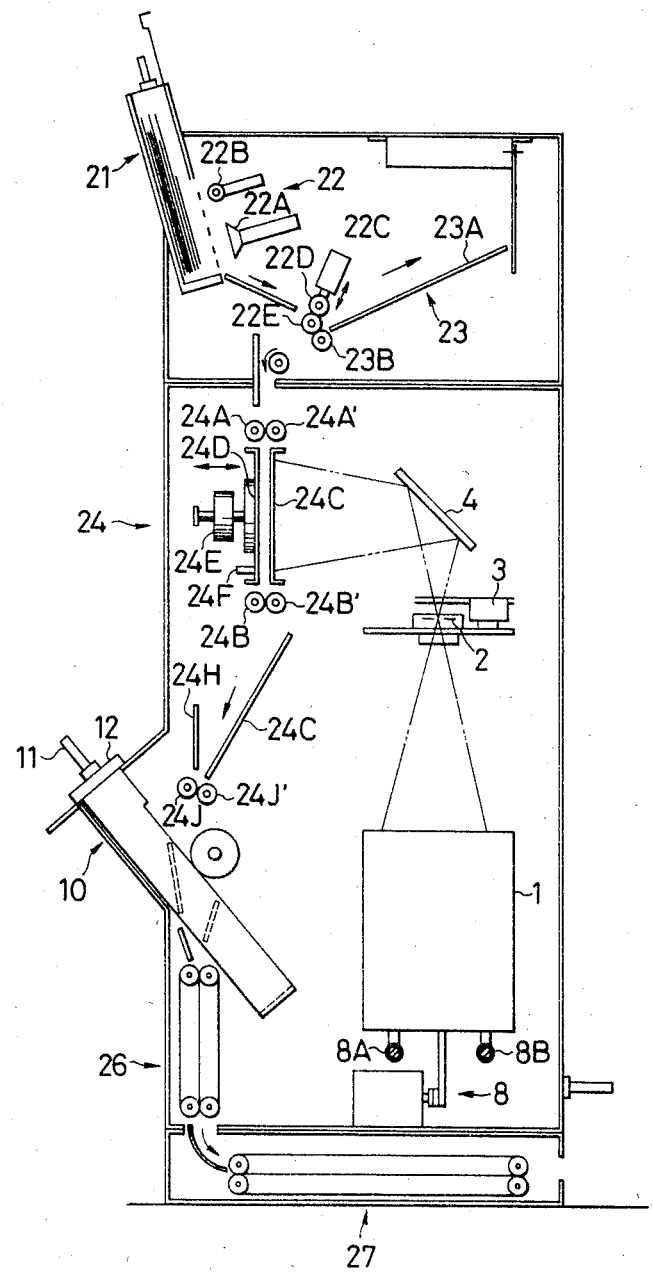

FIGS. 1A and 1B are diagrams showing the construction of a separate-exposure photographing apparatus of the invention. The apparatus can selectively perform a first process in which a number of films are supplied into a supply magazine and are extracted therefrom one at a time for exposure and exposed films are delivered into a receiving magazine, and a second process in which exposed films are delivered to an automatic developing unit. FIG. 1A shows a first state of the apparatus in which exposed films are received by the receiving magazine 25. FIG. 1B shows a second state of the apparatus in which exposed films are delivered to the automatic developing unit.

The above-described first state of the apparatus is obtained by setting the receiving magazine 25 at the receiving magazine setting position, as shown in FIG. 1A, while the second state is obtained by setting a dummy magazine 10 (described below) at the same position, as shown in FIG. 1B. The dummy magazine 10 has two functions: a first function of passing exposed films through the position where the receiving magazine is usually located to a film conveying path which is connected to the automatic developing unit, and a second function of intercepting light when the receiving magazine 25 is removed from the apparatus.

Figure 2:
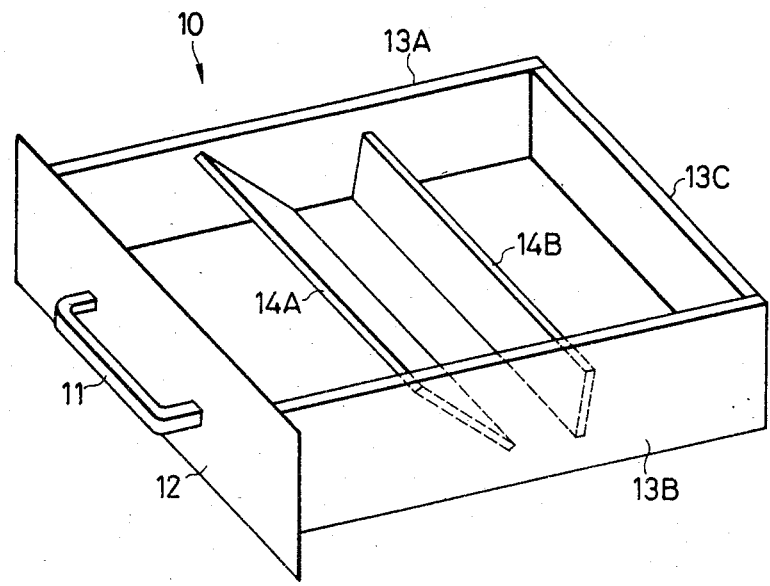
FIG. 2 is a perspective view showing a dummy magazine in FIG. 1B in detail.

FIG. 2 is a perspective view showing the dummy magazine 10 in detail. The dummy magazine 10 has the same external dimensions as the receiving magazine 25, and especially a handle 11 and a light shielding cover 12 thereof have completely the same dimensions as the corresponding members of the receiving magazine 25. The dummy magazine 10 includes the handle 11 and cover 12, side plates 13A, 13B and 13C, and film guides 14A and 14B. The side plates 13A through 13C define the external dimensions of the dummy magazine 10, which are equal to those of the receiving magazine 25 as described before. The film guides 14A and 14B are secured to the side plates 13A and 13C in such a manner that, when the dummy magazine 10 is set at the receiving magazine setting position, the film guides guide films from a film exposing section 24 (described below) towards the automatic developing unit.

Two detectors 15A and 15B are provided at the receiving magazine setting position. The detector 15A is operated by the light shielding cover 12, that is, it detects when the receiving magazine 25 or the dummy magazine 10 is at the receiving magazine setting position. On the other hand, the detector 15B detects when, after the receiving magazine 25 has been set at the receiving magazine setting position, its light shielding cover has been pulled out. In the case where the dummy magazine is used, the detector 15B does not operate.

In the case when both of the two detectors produce outputs, indicating that the receiving magazine 25 is set at the receiving magazine setting position, a process is performed whereby films are received in the receiving magazine 25, and when a predetermined number of films have been received therein, the film receiving operation is ended. In the case where only the detector 15A produces an output, indicating that the dummy magazine 10 is set at the receiving magazine setting position, a process is performed whereby, if the automatic developing unit is then able to receive and process films, films are delivered thereto continuously. When these conditions are not satisifed, films cannot be processed. The above-described conditions are indicated to the operator by display lamps (described below).

Figure 3:
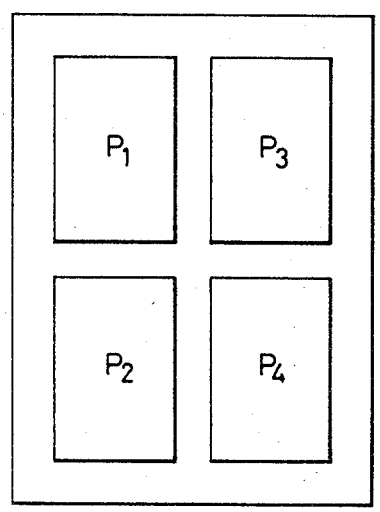
FIG. 3 is an explanatory diagram showing photographing positions on a film.

Other components of the apparatus will now be described. In this example, it is assumed that four individual pictures are taken on one sheet of film as shown in FIG. 3.

In FIGS. 1A and 1B, reference numeral 1 designates a television display unit; 2, a photographing lens; 3, a photographing shutter device; 4, a mirror; 8, a television display unit moving mechanism; 21, a film supply magazine; 22, a mechanism for extracting film from the film supply magazine; 23, a section for temporarily storing a film; and 24, a film exposing section. In FIG. 1A, reference numeral 25 designates the receiving magazine. In FIG. 1B, reference numeral 10 designates the dummy magazine. Further in FIGS. 1A and 1B, reference numerals 26 and 27 designate film conveying paths for transferring exposed films to the automatic developing unit (not shown). The film conveying paths can be constructed, for example, with pairs of conveying rollers and belts.

Figure 4:
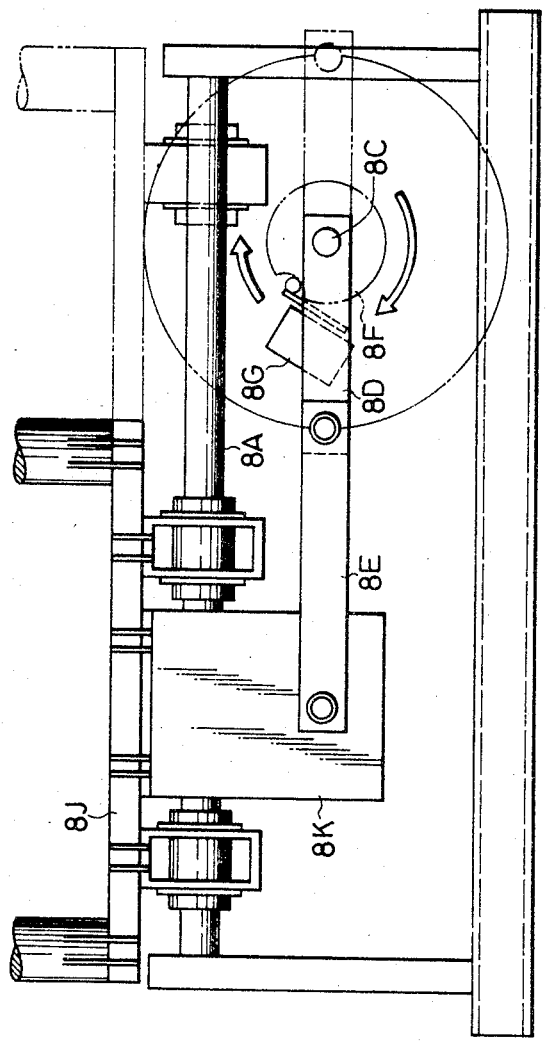
FIG. 4 is an explanatory diagram showing a television display unit moving mechanism used in the apparatus of FIGS. 1A and 1B.

The television display unit 1 is composed of a cathode-ray tube, having its display surface directed upwardly, and drive circuitry therefor. The television display unit moving mechanism 8 moves the television display unit 1 along guide rails in a direction perpendicular to the surface of the drawing. The television display unit moving mechanism 8, as shown in FIG. 4, is composed of a crank mechanism including a first arm 8D connected to the shaft 8C of a pulse motor and a second arm 8E rotatably coupled to the first arm 8D through a pin, and a movement position detecting mechanism including a cam 8F connected to the shaft 8C of the pulse motor and a limit switch 8G positioned where it can be engaged by the cam 8F.

The limit switch 8G is positioned with respect to the cam 8F and connected with the pulse motor such that the rotation of the pulse motor is stopped when the crank mechanism is at its bottom dead center position. The other end of the second arm 8E is rotatably connected through a pin to a bracket 8K provided on the bottom of a frame 8J which holds the television display unit 1 and is movable along the aforementioned guide rails 8A and 8B. As the pulse motor rotates, the television display unit 1 can be moved between the top dead center and the bottom dead center positions of the crank mechanism.

For movement position control of the television display unit, the bottom dead center of the crank mechanism where the cam 8F is engaged with the limit switch 8G is employed as a reference position, and the distance of movement from the reference position is controlled by the number of pulses applied to the pulse motor.

The photographing lens 2, the photographing shutter device 3 and the mirror 4 are mounted integrally with the television display unit 1 (although they are shown separated from one another in FIGS. 1A and 1B for convenience of illustration), and therefore are moved in a direction perpendicular to the surface of the drawing by the television display unit moving mechanism 8 while their position relative to the television display unit is unchanged.

Figure 5:
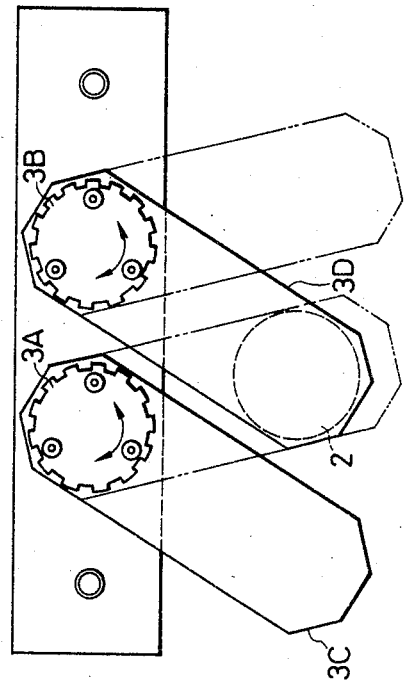
FIG. 5 is an explanatory diagram showing a photographing shutter device used in the apparatus of FIGS. 1A and 1B.
Figure 6A:
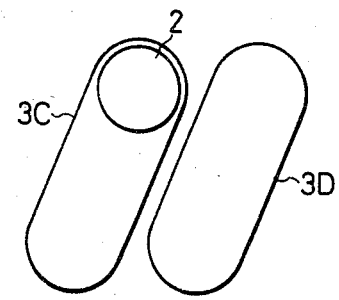
FIGS. 6A through 6B are diagrams used for a description of the operation of the photographing shutter device.

The photographing shutter device 3, as shown in FIG. 5 which is a plan view thereof, includes a normally closed shutter 3C and an normally open shutter 3D, which are driven by solenoids 3A and 3B, respectively. Before the solenoids 3A and 3B are energized, as shown in FIG. 6A, the normally closed shutter 3C is in the optical path while the normally open shutter 3D is out of the optical path.

Figure 6B:
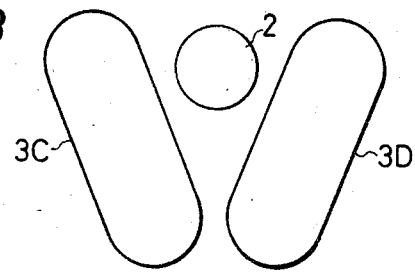
Figure 6C:
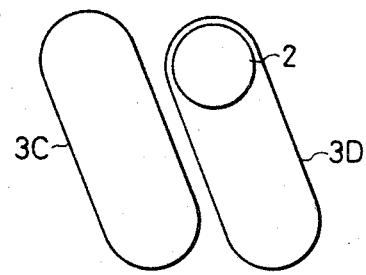
Figure 6D:
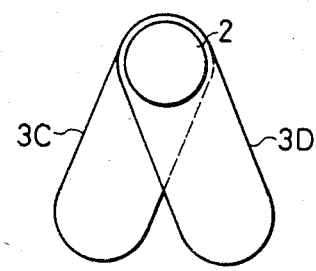

In response to a shutter operating signal, first the solenoid 3A is energized so that the normally closed shutter 6C is moved away from the optical path as shown in FIG. 6B, whereupon exposure is started. In a predetermined period of time, the solenoid 3B is energized so that the normally open shutter 3D is placed in the optical path as shown in FIG. 6C, whereupon exposure is ended. Thereafter, the solenoid 3A is deenergized so that the normally closed shutter is placed in the optical path as shown in FIG. 6D. Under this condition, the solenoid 3B is deenergized so that the normally open shutter 3D is retracted from the optical path. Thus, the shutter device is placed in its initial state.

The supply magazine 21 can accommodate, for instance, about one hundred sheets of film. One side of the magazine 21 has an opening through which films are extracted from the magazine. The opening is provided with a light shielding cover which can be pulled out. The opening is large enough to receive the film sucking and retaining discs 22A of a film extracting mechanism (described below). A magazine receiving section for receiving the supply magazine 21 is provided with a detector for sensing when the supply magazine 21 is correctly inserted, and a detector for sensing when the light shielding cover has been pulled out. These detectors may be implemented with limit switches of a well-known type.

The film extracting mechanism 22 includes a plurality of film sucking and retaining discs 22A connected to a vacuum pump (not shown), a film pressing roller 22B for preventing plural films from being taken up at one time by the film sucking and retaining discs 22A, and a rocking mechanism (not shown) which pushes the film sucking and retaining discs 22A against the surface of a film to thereby allow the discs 22A to suck and retain the film and to bring these discs to the next position. A detector 22C for sensing when plural films have been taken up at one time is provided at the outlet section of the film extracting mechanism 22. The detector 22C operates by detecting the amount of displacement of a film conveying roller 22D which operates together with a film conveying roller 22E. It goes without saying that a detecting system other than the above-described detecting system may be employed.

The temporary film storing section 23 is used to temporarily store a film which has been extracted from the supply magazine by the film extracting mechanism and delivered thereto by the pair of film conveying rollers 22D and 22E. The temporary film storing section 23 has a sloped film supporting board 23A and a pair of conveying rollers 22E and 23B for forwarding the film from the film supporting board to the next processing position. The film supporting board 23A is made of a material having a small frictional resistance so that the film can slide smoothly therealong.

The film exposure section 24 has two pairs of conveying rollers 24A, 24A' and 24B, 24B' for receiving a film and forwarding the film. A photographing mask 24C and a film pressure plate 24D are provided between the two pairs of conveying rollers. The photographing mask 24C is large enough to encompass the photographing positions $P_1$ and $P_3$ (or $P_2$ and $P_4$) on the film in the case where pictures are taken as shown in FIG. 3. This provides advantages that, when the television display unit 1 is moved, it is unnecessary to move the photographing mask 24C and the film is maintained sufficiently flat.

The film pressure plate 24D is connected to a pressure plate driving solenoid 24E secured to the body of the apparatus. The solenoid 24E is energized to move the pressure plate 24D towards the photographing mask 24C so that the film is maintained flat. When the solenoid 24E is deenergized, the pressure plate 24D is moved sufficiently far away from the photographing mask 24C that the film can be smoothly forwarded.

The film exposing section 24 further includes a film position reference sensor 24F. The sensor 24F operates to detect the front edge of a film which has been delivered from above. The output of the sensor 24F is used to stop the conveyance of the film. After one picture is taken, with the then-present position of the film as a reference, the film is moved a predetermined distance to set it to the next photographing position.

Provided below the film exposing section 24 are guides 24G and 24H and a pair of conveying rollers 24J and 24J', for directing into the receiving magazine 25 a film which has been delivered from the film exposing section in the case where the apparatus is placed in the above-described first state shown in FIG. 1A. The receiving magazine 25 can accommodate, for instance, about one hundred exposed films. Two opposed sides of the receiving magazine 25 have openings with respective light shielding covers. Exposed films received through one of the openings are subjected to developing then removed through the other opening; that is, so-called "first-in, first-out" processing can be effected.

In the case where the apparatus is placed in the above-described second state shown in FIG. 1B, the dummy magazine 10 for forwarding exposed films to the film conveying paths 26 and 27 is used instead of the receiving magazine 25. The guides 24G and 24H and the pair of conveying rollers 24J and 24J' operate to pass exposed film into the dummy magazine 10.

Figure 7:
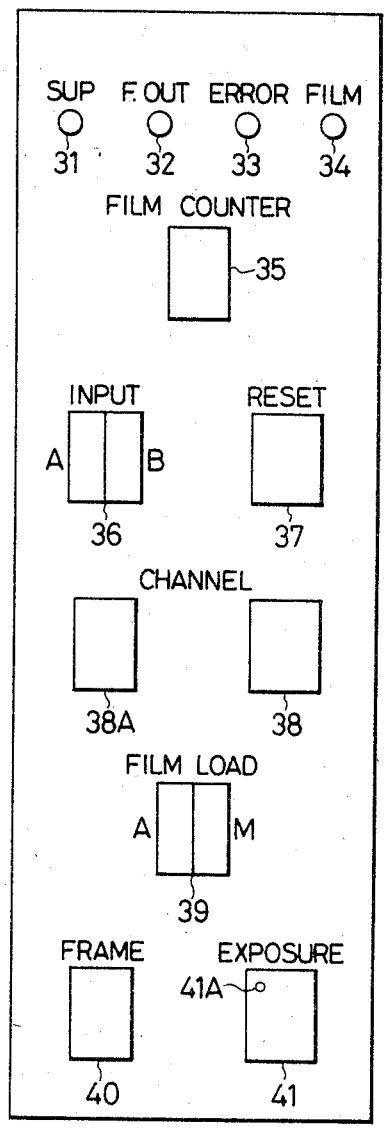
FIG. 7 is an explanatory diagram showing a remote control unit.

The apparatus is often operated while the operator is observing the monitor of a diagnostic unit such as an X-ray CT diagnosis unit or an ultrasonic diagnosis unit. Therefore, the apparatus is generally remote controlled. FIG. 7 shows a remote control unit for the apparatus of the invention. The remote control unit is so designed that it can be installed at a desired position on the body of the apparatus, for instance, using magnets.

In FIG. 7, reference numeral 31 designates a supply-magazine-setting-completion display lamp which indicates the fact that the supply magazine 21 has been correctly set in place and the light shielding cover has been pulled out so that the films can be extracted therefrom; and 32, a film-forwarding-section-setting-completion display lamp. In the case where the apparatus is placed in the first state in which exposed films are received by the receiving magazine, the display lamp 32 indicates the fact that the receiving magazine 25 has been correctly set in place and the light shielding cover on the film receiving side has been pulled out so that the receiving magazine can receive exposed films. In the case where the apparatus is placed in the above-described second state where exposed films are forwarded directly to the automatic developing unit, the display lamp 32 indicates the fact that a light shielding guide 40 (described below) has been correctly set so that exposed films can be delivered to the automatic developing unit.

Further in FIG. 7, reference numeral 33 designates an error display lamp; 34, a display lamp which indicates the fact that a film to be exposed next is stored in the temporary film storing section 23; 35, a counter display section for indicating the number of films exposed; 36, a switch for selecting one of two diagnostic units A and B for connection to the apparatus of the invention; 37, a reset switch; 38, a switch for selecting a photographing condition channel according to the photographing image characteristic, the characteristic of a film to be used, etc.; 38A, a display section for the switch 38; 39, a switch for determining whether the films are to be fed in an automatic mode or in a manual mode; 40, a display section for indicating a frame number on a film; and 41, an exposure switch.

The operation of the apparatus thus constructed will be described, assuming that four images are photographed in the order of $P_1$ through $P_4$ as indicated in FIG. 3.

First, the following preparatory operation is carried out: In a dark room, films are loaded in the supply magazine 21, and then the light shielding cover is set in place. The supply magazine 21 is set in the magazine receiving section, and the light shielding cover is pulled out. The receiving magazine is set at the receiving magazine setting position, and its film receiving opening is opened.

Under this condition, the power switch of the apparatus is turned on, and the initial setting operation is carried out. The initial setting operation includes an operating of setting the television display unit 1 at a position corresponding to the image position $P_1$ on the film, an operation of causing the operating parts of the film extracting mechanism, for instance, the film sucking and retaining discs 22A, to stand by in place, and an operation of driving the vacuum pump. In addition, the display sections of the remote control unit are reset.

The select switch 36 of the remote control unit is operated to select one of the diagnostic units, and the selection switch 38 is operated to select one of the photographing condition channels according to the image characteristics of the diagnosis unit thus selected and the characteristics of the film being used. In addition, it is determined whether films should be fed in the automatic feed mode or in the manual feed mode.

At this point, all preparations for starting the photographing operation have been accomplished. Next, the photographing operation will be described with reference to the case of feeding films in the automatic feed mode.

Prior to the photographing operation, the operator presses the exposure switch 41 of the remote control unit. This action is required only when the apparatus is started. Upon depression of the exposure switch, the film extracting mechanism 22 starts operating, that is, a film is extracted from the supply magazine 21 and passed through the temporary film storing section 23 to the reference position in the film exposing section 24. In the automatic feed mode, the feeding of each of the following films is started automatically when the preceding film held in the film exposing section 24 is used, for instance, when an image photographing operation for the first photographing position $P_1$ is carried out. The extracted film is temporarily held at the temporary film storing section 23. With this operation, for continuous photographing, the time required for exchanging the film is greatly reduced.

After the operator has operated the exposure switch to set the film at the photographing position as described above, when the operator wishes to record a desired image while observing the monitor of the diagnostic unit, he depresses the exposure switch 41 of the remote control unit. As a result, an image on the cathode-ray tube of the television display unit 1 is photographed on the film at the position $P_1$ when the shutter device is operated.

Once the image has been photographed on the film at the position $P_1$, the pulse motor is operated to drive the pairs of conveying rollers 24A, 24A' and 24B, 24B' to move the film a predetermined distance so that the position $P_2$ on the film is moved to the photographing position. This condition is indicated to the operator by the display lamp 41A provided for the exposure switch 41 of the remote control unit. Upon confirming that exposure is again permitted, that is, when the display lamp 41A has been turned on, the operator carries out an image photographing operation for the photographing position $P_2$.

After the image photographing operation, the television display unit moving mechanism 8 operates to move the television display unit 1 from the position corresponding to the photographing positions $P_1$ and $P_2$ to that corresponding to the photographing positions $P_3$ and $P_4$. This operation is controlled by the operation of the crank mechanism carried out in association with the rotation of the pulse motor of the television display unit moving mechanism 8 and by the position detection operation carried out using the cam. At the same time, the pulse motor in the film exposing section 24 is driven to return the film to is initial position. By the above-described two movements, the position $P_3$ on the film is set at the photographing position. When the photographing operation for the position $P_3$ on the film has been accomplished, the film is moved to the position $P_4$ in completely the same manner as in the case when the image photographing operation for the position $P_1$ is accomplished.

Following the image photographing operation for the position $P_4$ on the film, the film, guided by the guides 24G and 24H, is sent to the receiving magazine 25 if the automatic feed mode is in effect, or, if the manual feed mode is in effect, it is sent into the dummy magazine 10. The films sent to the receiving magazine are removed together with the receiving magazine and delivered to the following processing station when necessary. The films sent to the dummy magazine 10 are conveyed through the film conveying paths 26 and 27 to the automatic developing unit (not shown).

At the same time, the television display unit 1 is returned to the position corresponding to the position $P_1$ on the film. At the time when the exposed film is delivered from the film exposing section 24 or a suitable lag time thereafter, the next film held at the temporary film storing section 23 is forwarded to the predetermined position in the film exposing section 24. In association with this movement of the next film, the photographing frame number on the display section 40 of the remote control unit is returned to "1". Thus, all preparations for the next photographing operation have been accomplished.

In the above description, the films are fed in the automatic feed mode. However, in the case where, for instance, a small number of films is used, the manual feed mode may be employed. In the manual feed mode, it is detected when a film is set by the first operation of the exposure switch, and temporarily storing or holding a film at the temporary film storing section 23 is accordingly not carried out.

The information displayed by the error display section 33 includes indications that: a film has not been satisfactorily sucked and retained by the film extracting mechanism, a film has not moved correctly from the temporary film storing section 23 to the film exposing section 24, a film has not moved correctly from the film exposing section 24 to the receiving magazine 25 or the dummy magazine 10, a film has not moved correctly to the photographing position in the exposing section 24, and the television display unit 1 has not moved correctly. Of course, the displayed information is not limited to these conditions.

In the above-described embodiment, the correct placement of the receiving magazine and the dummy magazine in the receiving magazine setting section are detected by the two detectors 15A and 15B as described above. However, a different detecting system may be employed. The sequential operations of the apparatus described above may be controlled by a combination of logic circuits, or they may be controlled by a microcomputer according to a prestored program.

In the above-described embodiment, four pictures are photographed on one film. However, the number of pictures per film is not limited to four only and may be selected as desired. The distance of movement of the television display unit moving mechanism and the film fowarding mechanism in the film exposing section 24 can be changed as required to accommodate different numbers and arrangements of pictures. Examples of the conditions to be established for the photographing condition channels include, for instance, negative image, positive image, contrast, brightness and exposure time.

Some of the display sections of the remote control unit may be designed so that a display lamp and an alarm unit such as a buzzer are operated in combination. For instance, in the error display section 33, a variety of contents to be displayed can be distinguished from one another in such a fashion.

In the above-described embodiment, the configuration of the dummy magazine 10 is as shown in FIG. 2. However, the invention is not limited thereto or thereby.

In the above-described embodiment, the technical concept of the invention is applied to a separate-exposure photographing apparatus, but it should be noted that the invention is not limited thereto or thereby.

As is apparent from the above description, in the photographing apparatus of the invention, the photographing apparatus can readily be connected to and disconnected from an automatic developing unit or the like using a simple operation. This increases the range of application of the photographing apparatus. Further-more, even in the event the automatic developing unit becomes out of order, exposed films can be temporarily received in the receiving magazine, and therefore the photographing operations can be continued.

We claim:

1. A photographic apparatus, comprising; an image display device for displaying an image to be photographed; an optical system for forming said image on a surface of a photographic film; film receiving magazine means for receiving exposed film; means for conveying said film to said film receiving magazine means, said film receiving magazine means comprising a selectable one of (1) a film receiving magazine; and (2) a dummy magazine; a processing station following said dummy magazine, said dummy magazine including guide means for directing film conveyed thereto to said processing station, and detecting means for discriminating between said dummy magazine and said film receiving magazine.

2. The photographing apparatus of claim 1, wherein said dummy magazine has dimensions substantially equal to dimensions of said film receiving magazine.

3. The photographing apparatus of claim 2, wherein said dummy magazine comprises: a handle; a cover to which said handle is fixed; side plates extending rearwardly from said cover; a rear plate extending between ends of said side plate opposite said cover; and said guide means including first and second film guides extending between said side plates and positioned to direct films received in said dummy magazine to film conveying means operating between said dummy magazine and said processing station.

4. The photographing apparatus of claim 3, wherein said film guides are made of a material having a low sliding resistance.

* * * * *